United States Patent
Uchigaito et al.

(10) Patent No.: US 9,927,996 B2
(45) Date of Patent: Mar. 27, 2018

(54) INFORMATION PROCESSING DEVICE

(71) Applicant: HITACHI, LTD., Chiyoda-ku, Tokyo (JP)

(72) Inventors: Hiroshi Uchigaito, Tokyo (JP); Seiji Miura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 91 days.

(21) Appl. No.: 15/116,622

(22) PCT Filed: Feb. 5, 2014

(86) PCT No.: PCT/JP2014/052607
§ 371 (c)(1),
(2) Date: Aug. 4, 2016

(87) PCT Pub. No.: WO2015/118623
PCT Pub. Date: Aug. 13, 2015

(65) Prior Publication Data
US 2016/0350020 A1  Dec. 1, 2016

(51) Int. Cl.
*G06F 12/00* (2006.01)
*G06F 3/06* (2006.01)
*G06F 12/02* (2006.01)

(52) U.S. Cl.
CPC .......... *G06F 3/0626* (2013.01); *G06F 3/061* (2013.01); *G06F 3/064* (2013.01); *G06F 3/0679* (2013.01); *G06F 3/0685* (2013.01); *G06F 12/0246* (2013.01); *G06F 3/067* (2013.01); *G06F 3/0652* (2013.01); *G06F 2212/1016* (2013.01); *G06F 2212/1044* (2013.01); *G06F 2212/7208* (2013.01); *G06F 2212/7211* (2013.01)

(58) Field of Classification Search
None
See application file for complete search history.

(56) References Cited

U.S. PATENT DOCUMENTS

| 7,139,864 | B2 | 11/2006 | Bennett et al. |
| 7,254,668 | B1 | 8/2007 | Chang et al. |
| 2017/0046068 | A1* | 2/2017 | Tan ................ G06F 3/0679 |

* cited by examiner

*Primary Examiner* — Brian Peugh
(74) *Attorney, Agent, or Firm* — Miles & Stockbridge P.C.

(57) ABSTRACT

An information processing device includes a host and a memory subsystem. The host issues an identifier indicating a data erasable order and a data write command to the memory subsystem and includes an information processing circuit for processing the data. The memory subsystem includes a first memory and a control circuit for writing the data in the first memory. The first memory has a data erase unit size larger than a data write unit size. The control circuit classifies the data based on the identifier, writes the data belonging to a first group in a first simultaneous erase region, in which data can be simultaneously erased, in the first memory, and writes the data belonging to a second group different from the first group in a second simultaneous erase region, in which data can be simultaneously erased, in the first memory. Consequently, the performance and the life of a storage device can be improved, and costs of the storage device can be reduced.

15 Claims, 16 Drawing Sheets

FIG. 8A

| Gr. | Large Gr. |
|---|---|
| 1~256 | 1 |
| 257~512 | 2 |
| ... | ... |
| 7937~8192 | 32 |

FIG. 8B

| Large Gr. | Write cnts. | Physical Address | | | | |
|---|---|---|---|---|---|---|
| | | Ch, way, block (1) | Ch, way, block (2) | Ch, way, block (3) | ... | Ch, way, block (i) |
| 1 | 1230 | 1, 1, 22 | 2, 1, 31 | 3, 1, 64 | ... | i, 1, 1 |
| 2 | 832 | 2, 2, 3 | 3, 2, 2 | 4, 2, 5 | ... | 1, 2, 19 |
| ... | ... | ... | ... | ... | ... | ... |
| 32 | 1225 | 5, 3, 36 | 6, 3, 10 | 7, 3, 91 | ... | 4, 3, 76 |

BLK_ST

| Ch, way, block | Status of block | Erase cycle |
|---|---|---|
| 1, 1, 1 | "ERASED" | 1002 |
| 1, 1, 2 | "ALLOCATED" | 787 |
| 1, 1, 3 | "BAD" | 62 |
| ... | ... | ... |
| i, j, N_br | "PROGRAMMED" | 665 |

| Gr. | Large Gr. |
|---|---|
| 1~256 | 1 |
| 257~512 | 2 |
| ... | ... |
| 7937~8192 | 32 |

| Gr. | Large Gr. |
|---|---|
| 1~128 | 1 |
| 129~256 | 2 |
| ... | ... |
| 8065~8192 | 64 |

| Gr. | Large Gr. |
|---|---|
| 1~256 | 1 |
| 257~512 | 2 |
| ... | ... |
| 7937~8192 | 32 |

| Gr. | Large Gr. |
|---|---|
| 1~205 | 1 |
| 206~530 | 2 |
| ... | ... |
| 7920~8192 | 32 |

INFORMATION PROCESSING DEVICE

BACKGROUND OF THE INVENTION

1. Field of the Invention

The present invention relates to an information processing device suitable for processing big data at high speed.

2. Description of the Related Art

In the future, as demand of a big data analysis increases, a data amount handled by a calculator will explosively increase. On the other hand, the capacity of a DRAM incorporated in a calculator is limited. Therefore, a technique is desired which can store big data in an inexpensive and large capacity nonvolatile memory and enable a high speed analysis.

The large capacity nonvolatile memory has a data erase unit (block) larger than a data write unit, and therefore data cannot be overwritten. Further, in a conventional storage device using a nonvolatile memory, data which are unnecessary at different timings are mixed in the same block of the nonvolatile memory. Therefore, the storage device reads physically scattering necessary data from each block, erases the block from which the data has been read, and writes the read data back to the erased block. This process is called a garbage collection.

U.S. Pat. No. 7,254,668 B1 and U.S. Pat. No. 7,139,864 B2 disclose a technique, in a storage device using a nonvolatile memory, for classifying data based on a logical address and a write order of data and determining a data write target based on the classification.

SUMMARY OF THE INVENTION

When a garbage collection occurs in a storage device using a nonvolatile memory, reading/writing processes in a host is waited, and performance of the storage device is decreased. In addition, the garbage collection includes an erase process, and therefore life of the storage device in which an erase frequency is limited is deteriorated. Further, the storage device needs to include an extra nonvolatile memory to perform the garbage collection, and cost increase in the storage device is caused. To solve these issues, it is necessary to eliminate the garbage collection.

In the technique disclosed in U.S. Pat. No. 7,254,668 B1, data is classified based on a logical address, and necessary data and unnecessary data are still mixed in a same block of a nonvolatile memory. Further, in the technique disclosed in U.S. Pat. No. 7,139,864 B2, data is classified based on a data write order, and necessary data and unnecessary data are still mixed in a same block of a nonvolatile memory. Therefore, when a garbage collection is tried to be eliminated, a size of a data write target region secured on the nonvolatile memory is increased, and cost of a storage device is increased.

An object of the present invention is to eliminate a garbage collection and also to reduce cost of a storage device by reducing a capacity of a nonvolatile memory necessary for the storage device.

To achieve the above object, the present invention applies a configuration described in Claims.

An information processing device according to the present invention includes a host and a memory subsystem. The host issues an identifier indicating a data erasable order and a data write command to the memory subsystem and includes an information processing circuit for processing the data. The memory subsystem includes a first memory and a control circuit configured to write the data in the first memory. The first memory has a data erase unit size larger than a data write unit size. The control circuit classifies the data based on the identifier, writes the data belonging to a first group in a first simultaneous erase region, in which data can be simultaneously erased, in the first memory, and writes the data belonging to a second group different from the first group in a second simultaneous erase region, in which data can be simultaneously erased, in the first memory.

Further, an information processing device according to the present invention includes a host and a memory subsystem. The host issues a data write command to the memory subsystem, includes an information processing circuit for processing the data, and classifies the data based on an identifier indicating a data erasable order. The memory subsystem includes a first memory having a data erase unit size larger than a data write unit size, and a memory subsystem control circuit configured to write the data belonging to a first group in a first simultaneous erase region, in which data can be simultaneously erased, in the first memory and write the data belonging to a second group different from the first group in a second simultaneous erase region, in which data can be simultaneously erased, in the first memory, in accordance with the write command of the host.

According to the present invention, a large scale memory space necessary for such as a big data analysis can be inexpensively provided by using a nonvolatile memory, and also in the case where there are many types of identifiers indicating a data erasable order, a garbage collection can be eliminated, and also a necessary capacity of the nonvolatile memory can be reduced. Accordingly, while improving performance and life of a storage device, cost of the storage device can be reduced.

BRIEF DESCRIPTION OF THE DRAWINGS

FIGS. 8A and 8B illustrate an example of a data management table used for processing by the memory subsystem control circuit;

DESCRIPTION OF THE PREFERRED EMBODIMENTS

An embodiment of a preferable server (information processing device) will be described in detail below with reference to attached drawings.

A. Configuration of Server

Figure 1:
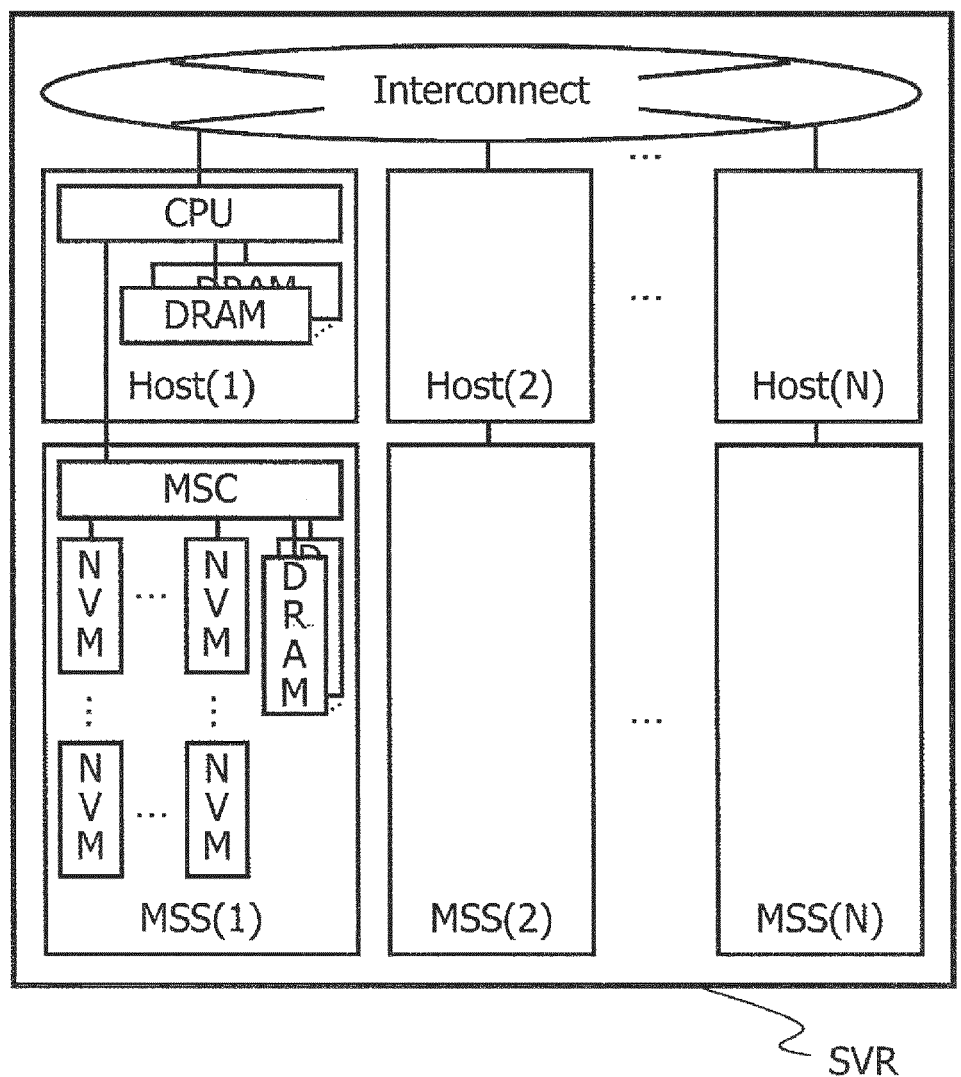
FIG. 1 illustrates a configuration example of a server (information processing device)

First, a configuration of a server (SVR) will be described with reference to FIGS. 1 and 2. FIG. 1 illustrates a configuration of the whole of the server which is an information processing device. The server includes multiple hosts (Host (1) to Host (N)), an interconnect (Interconnect) connecting every hosts, and multiple memory subsystems (MSS (1) to MSS (N)) connected to each of the hosts.

The host includes an information processing circuit (CPU), and one or more memories (DRAM) connected to the information processing circuit. Every hosts can communicate each other via the interconnect. Further, each of the hosts can communicate with the memory subsystem connected thereto. The information processing circuit reads information from a memory and the memory subsystem and performs a process by writing the information.

Each of the memory subsystems includes one memory subsystem control circuit (MSC), one or more nonvolatile memories (NVM), and one or more memories (DRAM). The memory subsystem control circuit can communicate with the host, the nonvolatile memory, and the memory.

The memory in the memory subsystem is a memory for storing management information, and a high speed DRAM is preferably used. However, other than the DRAM, a memory may be used, such as an MRAM, a phase change memory, an SRAM, and a NOR flash memory, and a ReRAM. Further, data to be written and data to be read are temporarily stored in the nonvolatile memory and may be used as a cash of the nonvolatile memory. The nonvolatile memory stores data written from the host. Examples of the nonvolatile memory include a NAND flash memory, a phase change memory, and a ReRAM, which are inexpensive and have a large capacity. These are memories in which a data erase unit is larger than a data write unit size.

Figure 2:
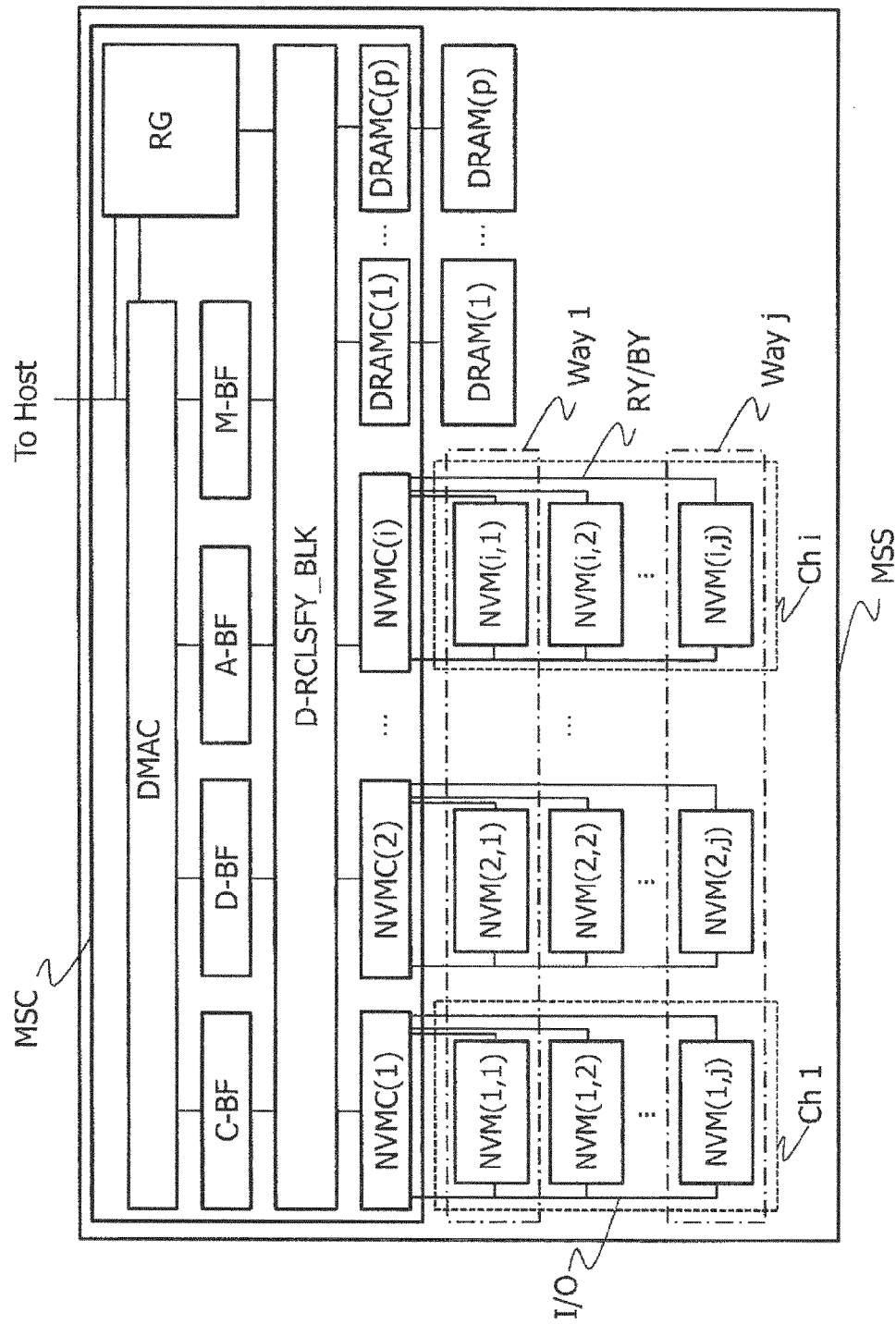
FIG. 2 illustrates a configuration example of a memory subsystem in the server.

FIG. 2 illustrates the memory subsystem in further detail.

The memory subsystem includes one memory subsystem control circuit (MSC), the nonvolatile memories (NVM (1, 1) to NVM (i, j)), and the memories (DRAM (1) to DRAM (p)) (i, j, and p are natural numbers). The memory subsystem control circuit includes a memory access control circuit (DMAC), a command buffer (C-BF), a data buffer (D-BF), an address buffer (A-BF), a meta data buffer (M-BF), a register (RG), a data reclassification block (D-RCLSFY-_BLK), nonvolatile memory control circuits (NVMC (1) to NVMC (i)), and DRAM control circuits (DRAMC (1) to DRAMC (p)).

The memory access control circuit (DMAC) is connected to the host illustrated in FIG. 1, the command buffer, the data buffer, the address buffer, the meta data buffer, and the register and performs data communication between connection destinations. Each of the command buffer, the data buffer, the address buffer, the meta data buffer, and the register is also connected to the data reclassification block. The command buffer temporality stores a read command, a write command, and an erase command of data. The data buffer temporarily stores data to be read/written. The address buffer temporarily stores an address of data in a read command, a write command, and an erase command from the host. Further, a data size can be temporarily stored.

The meta data buffer temporarily stores meta data such as a group number and a type (such as graph data (CSR), an analysis result (MSG)) of data in read, write, and erase commands from the host. However, the meta data is not limited to the above information and may be information other than the above.

A register stores control information necessary for each control in a data reclassification block (such as a total group number of data, a data size of each group, a data size written in a previous super step, update information of a graph), and the information can be read from the data reclassification block. However, the necessary control information are not limited to the above information and may be information other than the above.

The data reclassification block communicates with the register, the command buffer, the data buffer, the address buffer, and the meta data buffer and controls the nonvolatile memory control circuit and the DRAM control circuit.

The nonvolatile memory control circuits (NVMC (1) to NVMC (i)) are connected to the nonvolatile memories (NVM (i, 1) to NVM (i, j)) and reads, writes, and erases data in the connected nonvolatile memories. Here, "i" is a natural number and indicates a channel number. Multiple channels include a data transfer bus (I/O) which can independently communicate. The data transfer bus is shared among j nonvolatile memories (NVM (i, 1), NVM (i, 2), . . . , NVM (i, j)) belonging to one channel. Further, j nonvolatile memories belonging to each channel are independent memories and can independently process a command from the nonvolatile memory control circuit. In an order physically close to the nonvolatile memory control circuit, j nonvolatile memories belong to ways (Way 1, Way 2, . . . , Way j). The nonvolatile memory control circuit can determine whether each nonvolatile memory is processing data, by reading a signal of a ready/busy line (RY/BY) connected to each nonvolatile memory. The nonvolatile memory control circuit is connected to the data reclassification block and can communicate with each other.

The DRAM control circuits (DRAMC (1) to DRAMC (p)) are respectively connected to the memories (DRAM (1) to DRAM (p)) and read data from the memories and write data in the memories. Further, the DRAM control circuits are connected to the data reclassification block and communicate with each other.

B. Configuration of Nonvolatile Memory and Reading, Writing, and Erasing Processes With reference to FIG. 3, a configuration in a nonvolatile memory and reading, writing, and erasing processes of data will be described next. Each of the nonvolatile memories includes N_blk blocks (BLK). Each of the blocks includes N_pg pages (PG). Here, "N_blk" and "N_pg" are natural numbers. For example, a data size of one block in a NAND flash memory, which is the nonvolatile memory, having a capacity of 8 GB/chip is 1 MB. When a data size of one page is 8 kB, the following formulas are established, N_blk=8 k=(8 GB/1 MB) and N_pg=128=(1 MB/8 kB).

Figure 3:
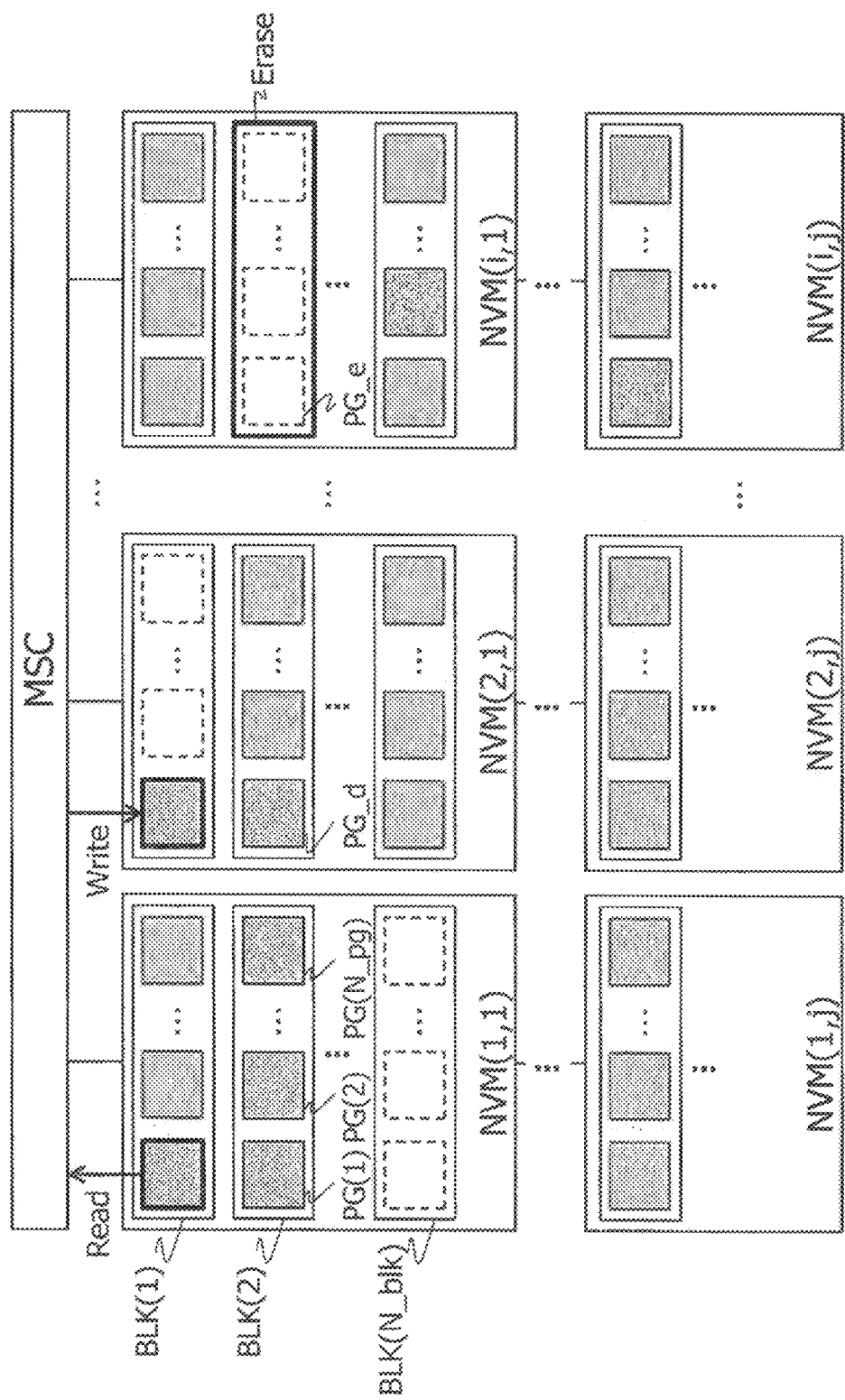
FIG. 3 illustrates an example of a configuration of a chip, a block, and a page of a nonvolatile memory in the memory subsystem and an example of a target to be read, written, and erased.

Data stored in the nonvolatile memory is read at a unit of the page, and the data is written in the nonvolatile memory at a unit of the page. Data stored in the nonvolatile memory is erased at a unit of the block. When data is written in the nonvolatile memory, the data cannot be overwritten. Therefore, for example, data can be written in a page (PG_e) in a block erased as illustrated in FIG. 3. However, new data cannot be written in a page (PG_d) in which data is already written. In summary, the nonvolatile memory has two characteristics as follows.

Characteristic 1: A data size of an erase unit (block) is equal to or larger than a data size of a write unit (page).

Characteristic 2: New data cannot be overwritten in such as a page in which data is already written.

A process of a server will be described below by exemplifying a large scale graph analysis. First, an example of a graph handled in the server and an example of an analysis sequence of data of the graph will be described with reference to FIGS. 4 and 5.

C. Graph and Graph Analysis Sequence

Figure 4:
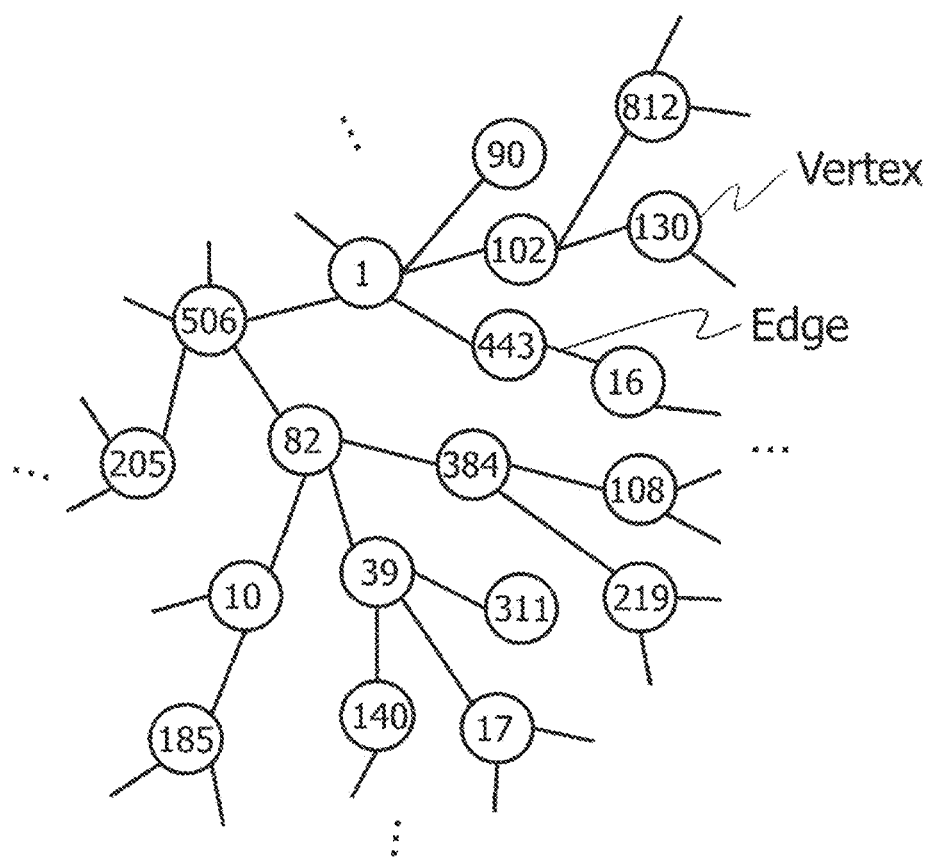
FIG. 4 illustrates an example of a graph of big data to be processed in the server.

FIG. 4 illustrates an example of a graph handled in a server. In a graph exemplified herein, a vertex number for uniquely specifying each vertex (Vertex) is allocated to a vertex of the graph. One side (Edge) of the graph, which connects two vertices, indicates that the two vertices are related. Each vertex of the graph and the relation between the vertices becomes graph data of an analysis target.

Generally, since a huge number of vertices of a graph are targeted for a graph analysis, the graph data is classified into groups in accordance with the vertex numbers and analyzed in each group. However, the graph to be analyzed is not limited to this example. The graph may be a directed graph which has a direction in the relationship between vertices, a multi-relational graph which has multiple kinds of relationships, a property graph which has supplementary information on each vertex and side, and a weighted graph in which supplementary information is weighted.

Figure 5:
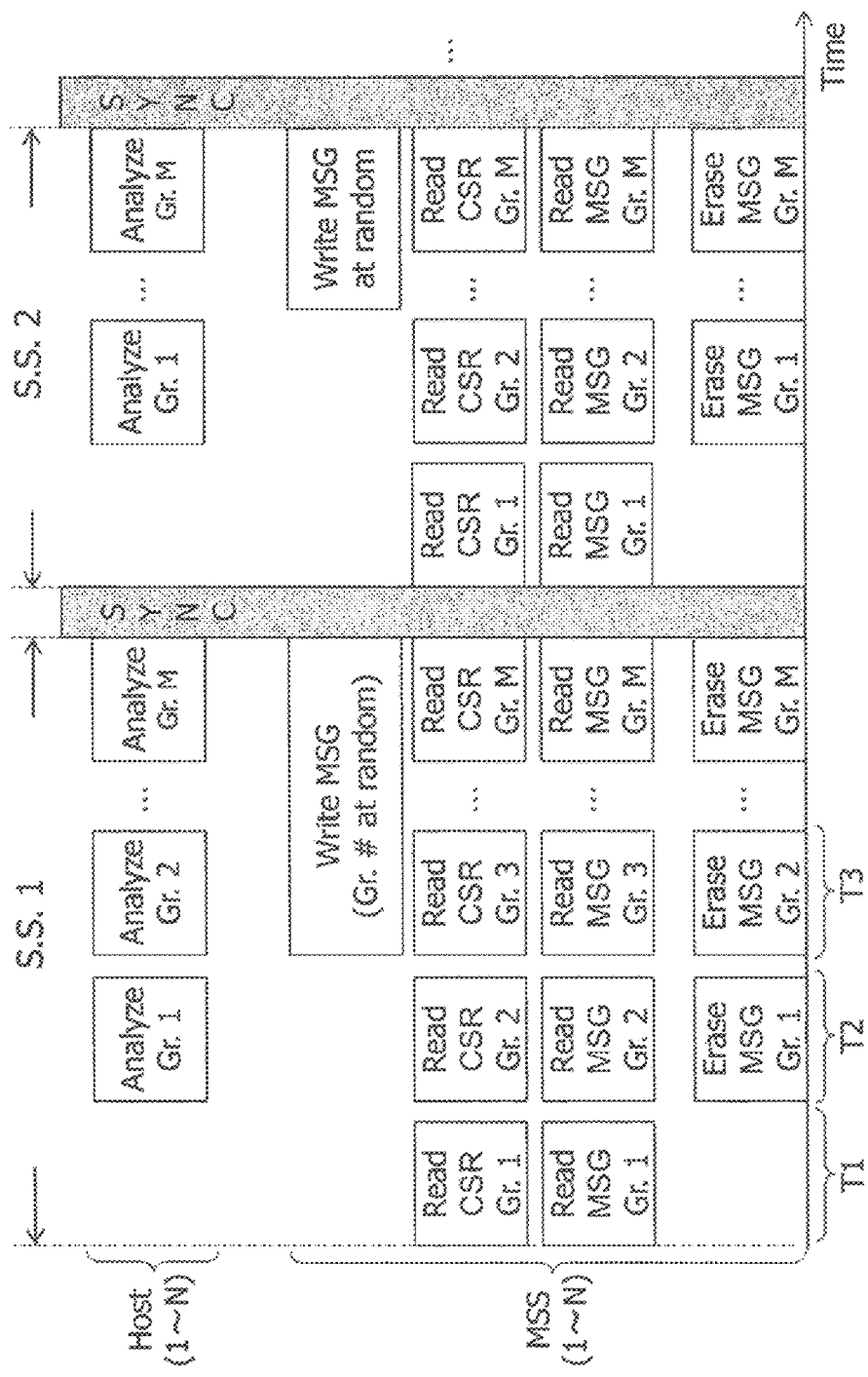
FIG. 5 illustrates an example of a sequence of graph analysis processing to be performed in the server.

FIG. 5 illustrates an example of a sequence of a graph analysis in the server. A nonvolatile memory in the memory subsystem (MSS) stores graph data (CSR) and a graph analysis result (MSG), and each of them is read and written in each group. A sequence below is simultaneously and parallelly performed in N hosts and the memory subsystem.

Time 1 (T1): First, the memory subsystem reads graph data (Read CSR Gr. 1) and a graph analysis result (Read MSG Gr. 1) belonging to a group 1 stored in the nonvolatile memory and sends the data and the result to the host.

Time 2 (T2): Next, the host analyzes the graph data and the graph analysis result in the group 1 sent from the memory subsystem (Analyze Gr. 1). In parallel with these, the memory subsystem reads graph data (Read CSR Gr. 2) and a graph analysis result (Read MSG Gr. 2) of a group 2 to be analyzed by the host next. Further, in parallel with these, the memory subsystem erases the graph analysis result of the group 1 (Erase MSG Gr. 1). The result can be erased at this timing since the result is not used again after the analysis by the host.

Time 3 (T3): Each host transmits a graph analysis result of the group 1 to other hosts. Each of the hosts classifies graph analysis results sent from the other hosts into each group and sends the results to the memory subsystem. The memory subsystem writes the graph analysis result, which has been sent from the host, in the nonvolatile memory at a write unit of the nonvolatile memory (Write MSG (Gr. # at random)).

The above-described sequence is repeated in a group order. After every groups 1 to M finish processing, synchronization for process completion is performed among hosts (Host (1) to Host (N)) (SYNC). This sequence of the processes and the synchronization of the groups 1 to M are called a super step (S.S.), and the processes are repeated in sequence from the group 1 after the synchronization. A graph analysis result (MSG) written in the memory subsystem in a previous super step is read in a next super step. The graph analysis is performed by repeating this super step.

D. Communication Between Host and Memory Subsystem

Figure 6A:
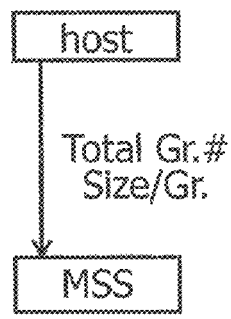
FIGS. 6A to 6C illustrate an example of information transmitted from the host to the memory subsystem.
Figure 6B:
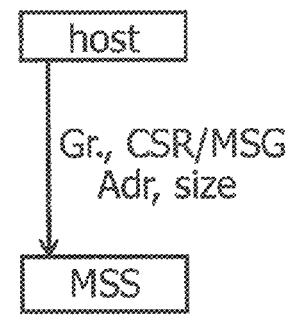
Figure 6C:
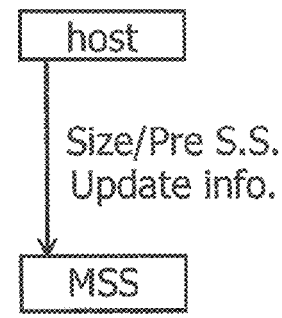

With reference to FIGS. 6A to 6C, communication between a host and a memory subsystem will be described. FIGS. 6A to 6C illustrate information to be sent to the memory subsystem by the host before a graph analysis is started, when data is written, and while a graph is analyzed.

A: Before Graph Analysis is Started (Before Analysis)

Before a host starts graph analysis, the host sends, to a memory subsystem, a total group number (Total Gr. #, corresponding to M in FIG. 5) and a data size of each group (Size/Gr.). The memory subsystem determines a data reclassification method based on the above information sent from the host and determines a write target of data of each group number.

B: When data is written (Write)

When a host issues a data write command to a memory subsystem (Write), the host sends, to the memory subsystem, a group (Gr.) number of write data, a data type (such as graph data (CSR) and an analysis result (MSG)), write data (data), a logical address (Adr), and a write data size (size). The memory subsystem writes data in the nonvolatile memory based on the above information sent from the host.

C: During graph analysis (S.S./Update)

While a graph analysis is performed, a host sends, to a memory subsystem, for example, at an interval of a super step, a data size of an analysis result written in a memory subsystem in a previous super step and a number of analyzed vertices (Size/Pre S.S.). Further, in the case where graph data is updated while the graph analysis is performed, the host sends to the memory subsystem update information of a graph (Update info.) such as when the graph data is updated. The memory subsystem updates a data reclassification method based on the above information sent from the host.

Next, in the case where a server performs graph processing, processing of a memory subsystem will be described with reference to FIGS. 7 to 17.

E. Processing of Memory Subsystem Control Circuit in Graph Analysis (1) Processing Before a Graph Analysis Starts Control by a memory subsystem before a graph analysis starts will be described with reference to FIGS. 7, 8A, and 8B.

Figure 7:
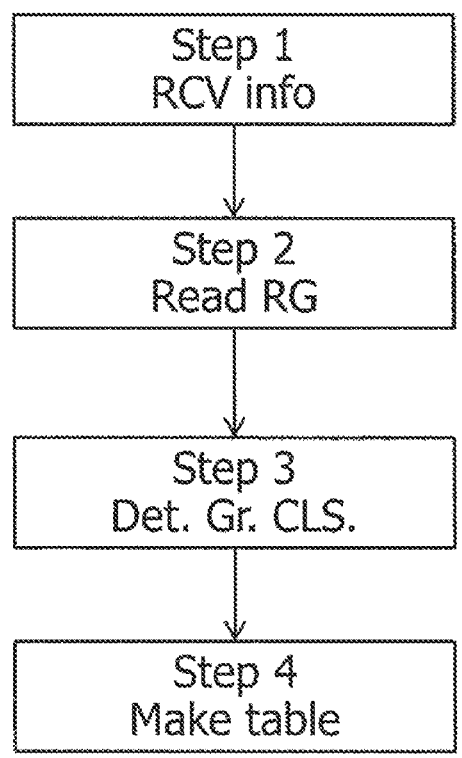
FIG. 7 is a flowchart illustrating an example of processing by a memory subsystem control circuit before a graph analysis.

FIG. 7 illustrates a control sequence of the memory subsystem. First, before starting a graph analysis, a host writes information necessary for control of the memory subsystem in a register of the memory subsystem (Step 1 RCV info). Information necessary for control of the memory subsystem includes a total group number in a graph analysis, a data size of each group (Size/Gr.), a number of vertices and sides of graphs. In the case of searching the shortest route in a graph, the information includes two vertices targeted for the shortest route search, specifically information specifying a start point and an end point. Next, a data reclassification block in a memory subsystem control circuit refers to the register (Step 2 Read RG) and determines a reclassification method based on the total group number and the data size of each group which are sent from the host (Step 3 Det. Gr. CLS.). Further, based on the reclassification method, the data reclassification block creates a table illustrated in FIGS. 8A and 8B and stores the table in a DRAM in the memory subsystem (Step 4 Make Table).

Gr-LGr in FIG. 8A is a table for managing correspondence between a group number of data sent from the host and a large group number (LGr) which is data classification determined by the data reclassification block. LGr-PA in FIG. 8B is a table for managing correspondence between a large group number and a write target of data (Physical Address). A detail of the data reclassification method will be described in "(3) Data Reclassification Method".

(2) Data Writing Process

Figures 11, 12:
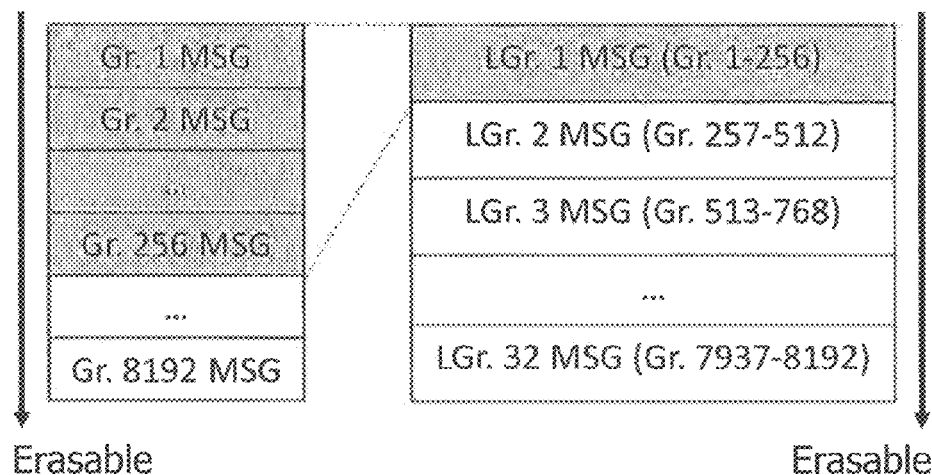
FIG. 11 illustrates an example of a block management table used for processing by the memory subsystem control circuit.
FIG. 12 illustrates an example of an erasable data order in graph processing.

Control in the case where data is written in a memory subsystem will be described with reference to FIGS. 9 and 11.

Figure 9:
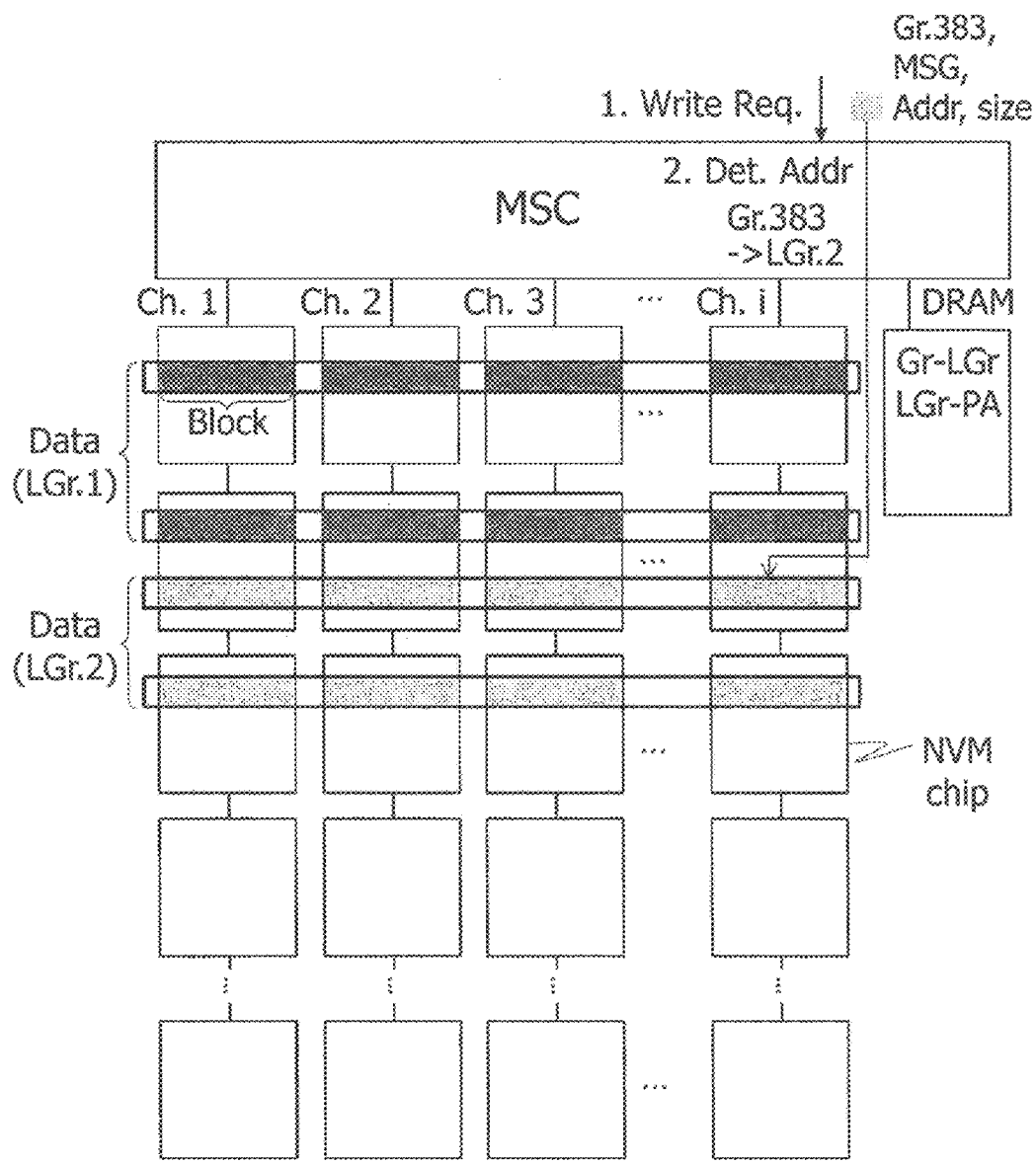
FIG. 9 illustrates an example of a data flow in a data write process by the memory subsystem control circuit and an example of a nonvolatile memory chip in which data corresponding to a large group number is stored.

As illustrated in FIG. 9, when data is written in the memory subsystem, a host sends, to a memory subsystem control circuit (MSC) with a write request, a data group number (Gr. 383), a data type (MSG), a logical address (Adr), and a data size (size) (1. Write Req.). The memory subsystem control circuit refers to a management table (Gr-LGr in FIG. 8A and LGr-PA in FIG. 8B) stored in a DRAM in the memory subsystem and determines a write target of data (2. Det. Addr). As illustrated in FIG. 9, a write target of data belonging to the same large group is distributed in multiple nonvolatile memory chips (NVM chip) belonging to each channel, and, at the same time, only data in the same large group are written in a simultaneous erase unit (Block) of the nonvolatile memory.

Figure 10:
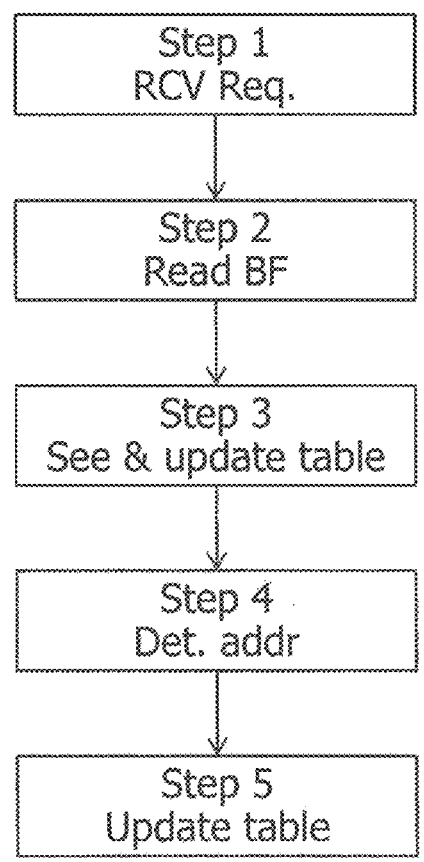
FIG. 10 is a flowchart illustrating an example of a data write process by the memory subsystem control circuit.

FIG. 10 illustrates a control sequence of a data reclassification block when data is written. First, a data reclassification block in a memory subsystem control circuit (MSC) refers to a command buffer and receives a data write request sent from a host (Step 1 RCV Req.). Next, the data reclassification block refers to a meta data buffer (M-BF) (Step 2 Read BF) and reads a group number of data. Similarly, the data reclassification block reads a logical address and a data size of the data from an address buffer. Then, the data reclassification block refers to the management table Gr-LGr (FIG. 8A) stored in a DRAM in the memory subsystem and determines a large group number corresponding to the group number read from the meta data buffer. Next, the data reclassification block refers to a line corresponding to the large group number in the management table LGr-PA (FIG. 8B). Then, the data reclassification block increases Page cnts. of the corresponding line by one. Consequently, in the case where the Page cnts. exceeds a threshold determined by the memory subsystem control circuit, the data reclassification block refers to a block management table (BLK_ST) illustrated in FIG. 11. Then, the data reclassification block selects one empty block "ERASED" from a nonvolatile memory chip belonging to each channel and updates an item of the Physical Address of the management table LGr-PA. Further, regarding the selected block, the Status of block recorded in the block management table (BLK_ST) is updated from "ERASED" to "ALLOCATED", and a value of the Page cnts. of a line corresponding in the management table LGr-PA is updated to 0 (Step 3 see & update table). Next, the data reclassification block refers to a line of the corresponding large group number in the management table LGr-PA and determines a write target of data (Step 4 Det. Addr). Finally, the data reclassification block updates a column of the Status of block in the block management table (BLK_ST) is updated from "ALLOCATED" to "PROGRAMMED" (Step 5 Update table).

(3) Data Reclassification Method

An example of the data reclassification method according to the present invention will be described with reference to FIGS. 12 and 13. FIG. 12 indicates an erasable order of data classified in a group and a large group. As indicated in a graph analysis sequence in FIG. 5, a host performs a graph analysis in order of group number, and the analysis result data (MSG) can be erased in the order ("Erasable" on the left side of FIG. 12). The data reclassification block classifies data in multiple consecutive group numbers together into the large group (LGr.). Therefore, the analysis result data (MSG) can be erased in a large group order as well as a group ("Erasable" on the left side of FIG. 12).

Figure 13:
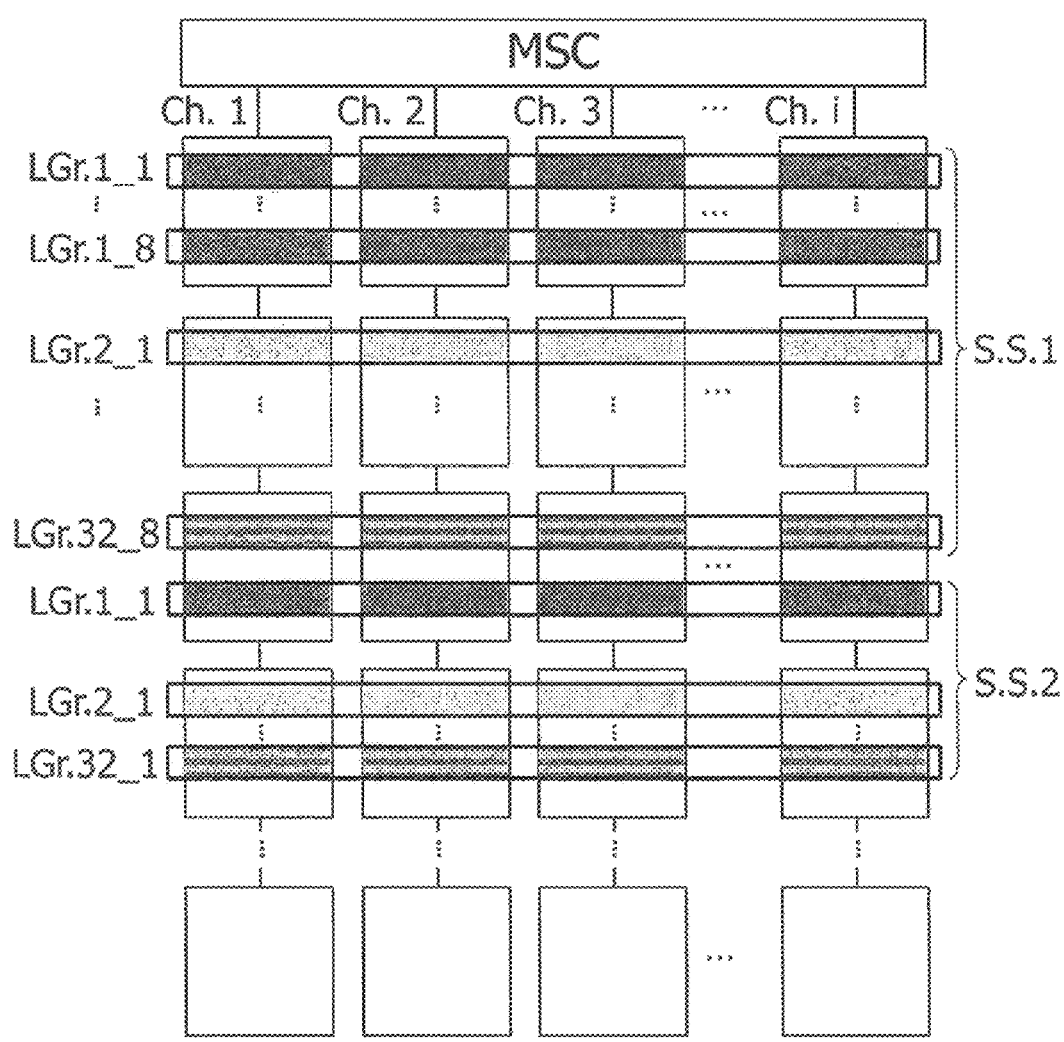
FIG. 13 illustrates an example of a storage region in an analysis result in a previous super step and a relationship between a write target region secured when a present super step starts and the nonvolatile memory chip.

As illustrated in FIG. 13, when a super step in a graph analysis starts, the data reclassification block in the memory subsystem control circuit (MSC) secures a write region for the large group number on a nonvolatile memory (S.S.2). When a number of the nonvolatile memories allocated to a write target of one large group is set to N_NVM (in FIG. 13, the number is equal to a channel number, and the formula, N_NVM=i, is established), erase blocks of N_NVM×(a number of large groups) nonvolatile memories are allocated to a write target when the super step starts. In the case where a page rank is calculated, a totally needed capacity of a nonvolatile memory is minimized when a capacity of the nonvolatile memory allocated when this super step starts and a data capacity erased for one large group are equal. In the case where a capacity of an erase block of the nonvolatile memory is denoted by BLK_sz, a total group number is denoted by g, and a group number in one large group is denoted by p, the capacity of the nonvolatile memory allocated when the super step starts is represented by (N_NVM×BLK_sz×g)/p. Further, in the case where a data size in one group is denoted by s, a data capacity erased in one large group is denoted by s×p. Therefore, the formula, $p=\sqrt{((N\_NVM \times BLK\_sz \times g)/s)}$, is established under the condition of p to equalize the capacities. Conforming to the above formula, a data reclassification block calculates how many groups should be classified into one large group.

(4) Relationship Between Logical Address and Physical Address

Figure 14:
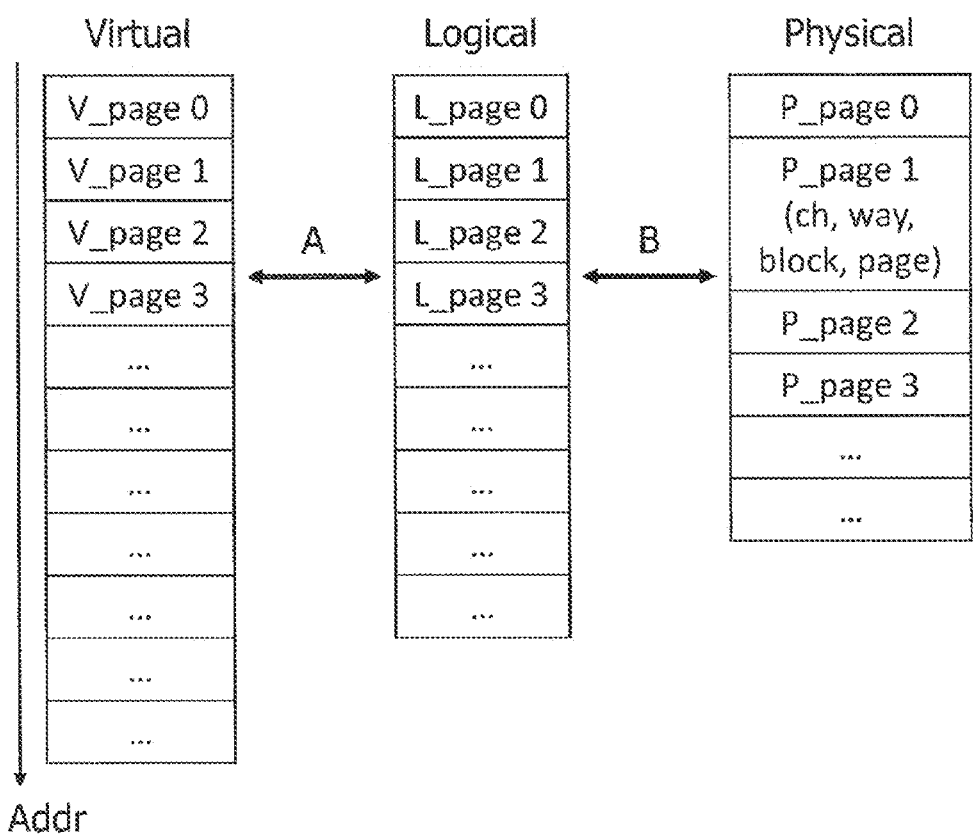
FIG. 14 illustrates an example of a relationship among a virtual memory, a logical address, and a physical address in the server.
Figure 15:
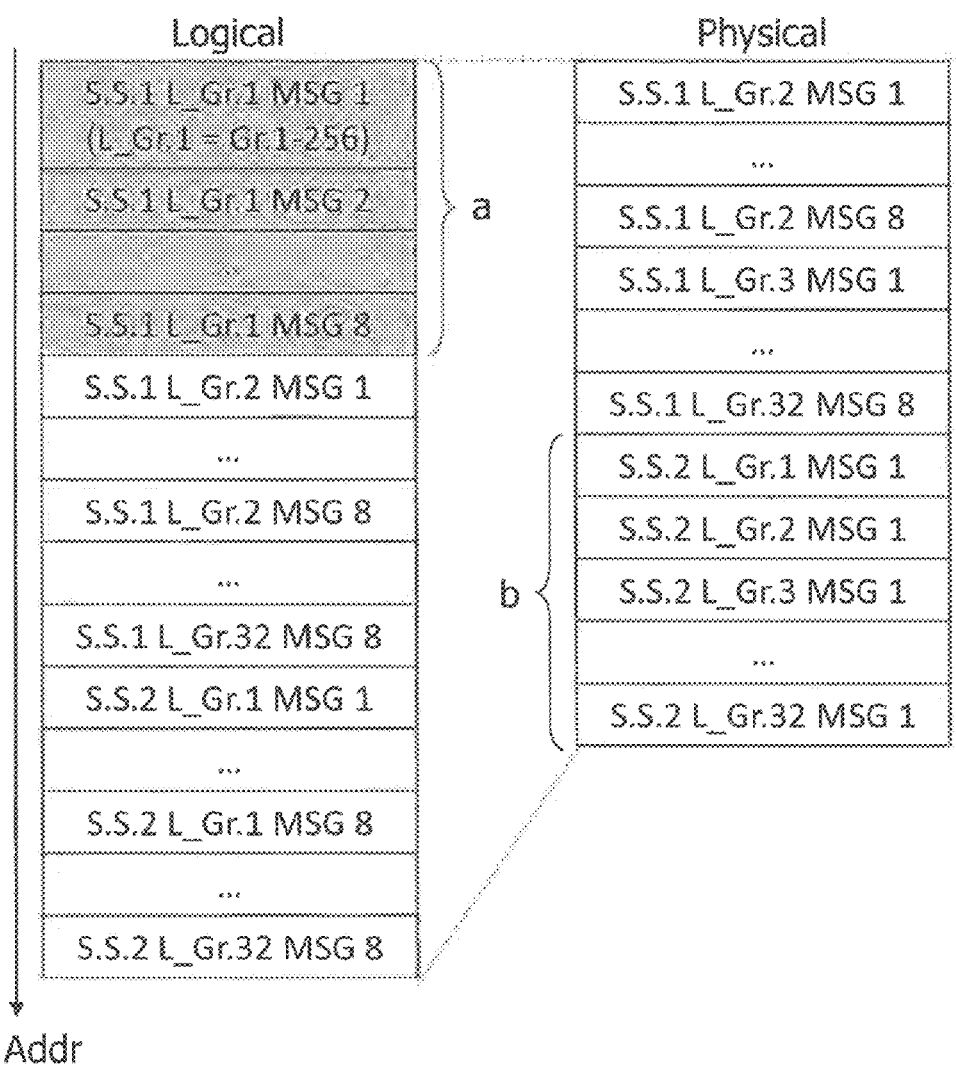
FIG. 15 illustrates an example of a relationship between the logical address and the physical address in the graph analysis.

With reference to FIGS. 14 and 15, a relationship between a logical address and a physical address according to the present invention will be described.

FIG. 14 illustrates a relationship among a virtual address, a physical address, and a physical address. The virtual address indicates an address space used in a process performed on OS and is managed at a page (V_page) unit. Further, the virtual address is generally allocated to each process from the OS regardless of actual capacities of a DRAM and a storage device. On the other hand, the logical address is an address allocated to each of the DRAM and the storage device and managed at a page unit (L_page). Further, the OS converts between the virtual address and the logical address (A in FIG. 14). The physical address is an address directly indicating a data storage target of the storage device, and for example, a channel, a way, a block, and a page are used in a memory subsystem. Generally, the logical address and the physical address are converted by a controller of a storage device (B in FIG. 14).

Next, the relationship between a logical address and a physical address according to the present invention is exemplified with reference to FIG. 15. The host which performs a graph analysis reads analysis result data (MSG) of a previous super step in order from a group 1, and the data is made unnecessary after the data is read. Therefore, a large group is also made unnecessary in order from 1. The host allocates, to a memory subsystem, a logical address space which can store analysis result data of two super steps. A region of a physical address space which is a capacity of a nonvolatile memory in the memory subsystem can be taken smaller than a region of a logical address space. A data reclassification block secures a physical address region (b in FIG. 15) for storing analysis result data of the next super step when the super step starts. Here, all data written in one super step (S.S.2 L_Gr.1 MSG 1-8 to S.S.2 L_Gr.32 MSG 1-8 in Logical) are not necessarily stored in the region of b. The region may be a size in which a write target of data belonging to all large groups (FIG. 15 b: S.S.2 L_Gr.1 MSG 1 to S.S.2 L_Gr.32 MSG 1) are uniquely specified. The data reclassification block erases unnecessary analysis result data (a in FIG. 15) from a nonvolatile memory. When the b region is shortage, a newly spaced region in the nonvolatile memory is allocated to a new b region.

(5) Processing During Graph Analysis

Figure 16:
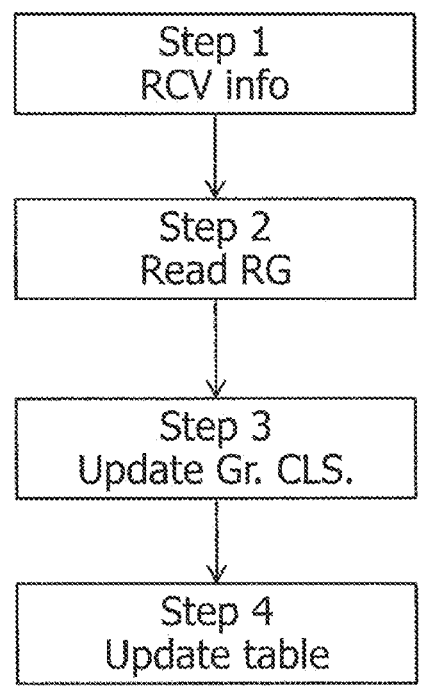
FIG. 16 is a flowchart illustrating an example of processing by the memory subsystem control circuit in intervals between super steps in a graph analysis or when a graph is updated.
Figure 17A:
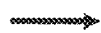
FIGS. 17A and 17B illustrate an example of an update of a management table in processing by the memory subsystem control circuit in the intervals between the super steps in the graph analysis or when the graph is updated.
Figure 17B:

With reference to FIGS. 16, 17A, and 17B, control during a graph analysis according to the present invention will be described.

FIG. 16 indicates a process sequence during the graph analysis. During a super step in a graph analysis and when graph data is updated, a host writes data necessary for control of the memory subsystem in a register of the memory subsystem (Step 1 RCV info). The data necessary for the control is, for example, information on the amount of analysis result data (MSG) written in a previous super step, a data size of each group, and increase/decrease in vertices. Next, a data reclassification block refers to a register (Step 2 Read RG) and updates a data reclassification method based on the information sent from the host (Step 3 Update Gr. CLS.). Then, the data reclassification block reflects the updated reclassification method in a management table (Step 4 Update table).

FIGS. 17A and 17B indicate an example of the updated data reclassification method. Based on information on a size of analysis result data written in a memory subsystem in a previous super step sent from a host, the data reclassification block updates the Gr-LGr table as illustrated in FIG. 8A. For example, in the case where the size of the analysis result data written in the previous super step is larger than an originally assumed data size, p is decreased in accordance with the formula indicated in (3). Therefore, the data reclassification block decreases the number of groups belonging to one large group (Pre S.S. size/Gr. in FIG. 17A). The control can be performed by counting a data size of the analysis result written during a previous super step by a memory subsystem even in the case where the data size of the analysis result written during the previous super step is not sent to the memory subsystem from the host. Further, in the case where information on the data amount of each group and increase/decrease in vertices are sent from the host to the memory subsystem when a graph is updated, a data reclassification block updates the Gr-LGr table as illustrated in FIG. 8B. For example, as a result of updating graph data, in the case where the number of vertices and a data amount of groups belonging to an original large group 1 are increased, and the number of vertices and a data amount of groups belonging to an original large group 2 are decreased, the data reclassification block decreases the number of groups belonging to the large group 1 and increase the number of groups belonging to the large group 2 (Update graph in FIG. 17B). Accordingly, the data reclassification block equalizes a data size between large groups.

F. Summary of Effects

Main effects obtained by the above-described configuration and processing are as follows.

By using a large capacity nonvolatile memory, a large scale memory space necessary for such as big data analysis can be inexpensively provided, and also in the case where there are many types of identifiers indicating a data erasable order, a garbage collection is eliminated, and a necessary capacity of the nonvolatile memory can be reduced. Specifically, a server processing big data at high speed stores data in a nonvolatile memory such as a NAND flash memory in which bit cost is less expensive than such as a DRAM. Even in such a case, the server can form a new large group by binding multiple group numbers indicating an erasable order, eliminate a garbage collection in the nonvolatile memory by which data in the same large group share the same erasable unit of the nonvolatile memory, enable high-speed data processing, and also reduce a necessary capacity of the nonvolatile memory even in the case where the number of group numbers is increased. Accordingly, while improving performance of a storage device, cost of the storage device can be reduced.

A server is exemplified in the above description. The server includes a host which performs data processing, a nonvolatile memory, and a memory subsystem control circuit which manages the nonvolatile memory. The server may include a host which manages a data analysis and a nonvolatile memory and a memory subsystem control circuit which controls a nonvolatile memory by conforming to the management by the host. The above description exemplifies a graph analysis of a large scale graph in a state in which relationship between a group number and a vertex number is fixed. However, in the case where the graph is dynamically changed, the relationship between the group number and the vertex number can be dynamically changed. Further, big data processing handled in the present invention is not limited to the above-described graph analysis. For example, memory processing may be performed, similar to the above processing, by dividing big data (controlled by key and value) into multiple groups by each key value in accordance with Key in MapReduce processing. Further, in big data processing application which secures a large layout on a source code, the above memory processing may be performed by recognizing the same layout as the same group, and an application range of the above processing includes a case of searching a large scale database and performing data extraction. In these processing, big data can be read and written at a high speed. Therefore, a big data processing can be accelerated.

With reference to attached drawings, an embodiment has been specifically described above. However, a preferable embodiment is not limited to the above description, and can be variously changed within a range of a gist of the embodiment.

What is claimed is:

1. An information processing device, comprising a host and a memory subsystem, wherein
   the host issues an identifier indicating a data erasable order and a data write command to the memory subsystem and comprises an information processing circuit configured to process the data,
   the memory subsystem comprises a first memory and a control circuit configured to write the data in the first memory, the first memory has a data erase unit size larger than a data write unit size, and the control circuit classifies the data based on the identifier, writes the data belonging to a first group in a first simultaneous erase region, in which data can be simultaneously erased, in the first memory, and writes the data belonging to a second group different from the first group in a second simultaneous erase region, in which data can be simultaneously erased, in the first memory.

2. The information processing device according to claim 1, wherein the host notifies the control circuit of the memory subsystem, of at least either one of a number of the different identifiers or a data size per identifier before processing the data.

3. The information processing device according to claim 2, wherein the control circuit of the memory subsystem determines a method for classifying the data corresponding to the identifier based on at least either one of the number of the different identifiers or the data size per the identifier.

4. The information processing device according to claim 1, wherein the host notifies the control circuit of the memory subsystem, of supplementary information of the data while the data is processed.

5. The information processing device according to claim 4, wherein the memory subsystem changes a method for classifying the data corresponding to the identifier based on the supplementary information of the data while the data is processed.

6. The information processing device according to claim 5, wherein the supplementary information of the data includes at least any one of a size of analyzed data, a number of the different identifiers, and a size of data belonging to the identifier.

7. The information processing device according to claim 1, wherein a total capacity of the first memory belonging to the memory subsystem in which a logical address allocated by the host is allocated is smaller than a total size of the logical address.

8. The information processing device according to claim 1, wherein the memory subsystem comprises:

a second memory accessible at a higher speed than a speed of the first memory; and the first memory which is a nonvolatile memory.

9. The information processing device according to claim 8, wherein the memory subsystem writes information managing classification of the data in the second memory.

10. An information processing device, comprising a host and a memory subsystem, wherein the host issues a data write command to the memory subsystem, comprises an information processing circuit configured to process the data, and classifies the data based on an identifier indicating a data erasable order, and the memory subsystem comprises:

a first memory having a data erase unit size larger than a data write unit size; and a memory subsystem control circuit configured to write the data belonging to a first group in a first simultaneous erase region, in which data can be simultaneously erased, in the first memory and write the data belonging to a second group different from the first group in a second simultaneous erase region, in which data can be simultaneously erased, in the first memory, in accordance with the write command of the host.

11. The information processing device according to claim 10, wherein the host determines a method for classifying the data corresponding to the identifier based on at least either one of a number of the different identifiers or a data size per identifier before processing the data.

12. The information processing device according to claim 10, wherein the host changes a method for classifying the data corresponding to the identifier based on supplementary information of the data while the data is processed.

13. The information processing device according to claim 12, wherein the supplementary information of the data includes at least any one of a size of analyzed data, a number of the different identifiers, and a size of data belonging to the identifier.

14. The information processing device according to claim 10, wherein a total capacity of the first memory belonging to the memory subsystem in which a logical address allocated by the host is allocated is smaller than a total size of the logical address.

15. The information processing device according to claim 10, wherein the memory subsystem comprises:

a second memory accessible at a higher speed than a speed of the first memory; and the first memory which is a nonvolatile memory.

* * * * *